H. B. MASSER.
Ice Cream Freezer.
No. 751. Reissued June 28, 1859.
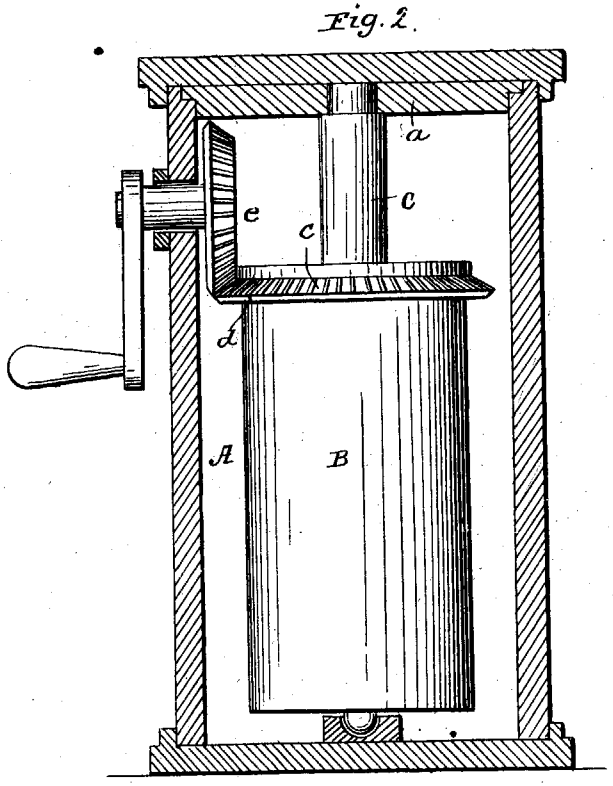
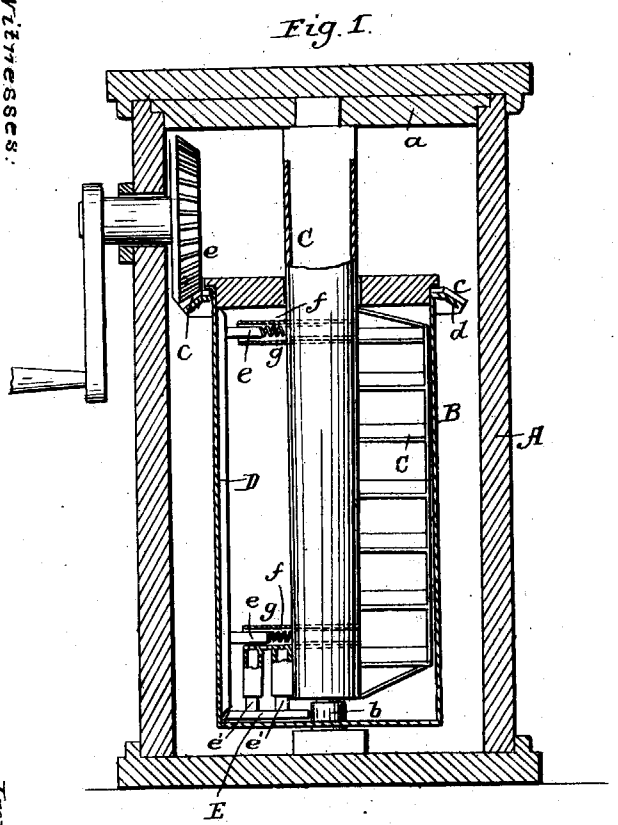
Witnesses:
M. McLinington
Chas. Hughes
Inventor:
H. B. Masser
N. PETERS. Photo-Lithographer, Washington, D. C.

UNITED STATES PATENT OFFICE.

H. B. MASSER, OF SUNBURY, PENNSYLVANIA.

IMPROVEMENT IN ICE-CREAM FREEZERS.

Specification forming part of Letters Patent No. 5,960, dated December 12, 1848; Additional Improvement January 1, 1850; Reissue No. 751, dated June 28, 1859.

*To all whom it may concern:*

Be it known that I, H. B. MASSER, of Sunbury, in the county of Northumberland and State of Pennsylvania, have invented a new and useful Improvement in Ice-Cream Freezers; and I do hereby declare that the following is a full, clear, and exact description of the same, reference being had to the accompanying drawings, forming a part of this specification, in which—

Figure 1 is a vertical central section of my improved freezer, and Fig. 2 is a vertical section of the ice-box with the cream-chamber in elevation.

Similar letters of reference in each of the two figures indicate corresponding parts.

The object of my invention is to provide a scraper or scrapers which will during the process of freezing cream bear against the inner freezing surface or surfaces of the cream-chamber without materially resisting the rotation and scrape off the cream which collects on said surface or surfaces, and thus constantly keep the surface or surfaces of the cream-chamber exposed to the cream.

The nature of my invention consists in the employment of a scraper or scrapers which act or bind during the process of freezing cream with a yielding spring force against the inner surface or surfaces of the cream-chamber, as hereinafter more fully described.

To enable others skilled in the art to make and use my invention, I will proceed to describe its construction and operation.

A represents the ice-chamber, B the cream-chamber, and C the slatted dasher. The dasher is stationary, being fitted securely at its upper square end in a cross-brace, *a*, of the ice-box, and at its lower round end loosely in a step, *b*, of the cream chamber. The cream-chamber is arranged to revolve, being furnished with bevel gear-teeth *c* round its upper flanged edge *d*, said teeth gearing with the teeth of a bevel-wheel, *e*, of the crank-shaft. The freezer thus far described is not now claimed by me, and is only alluded to in order to illustrate the operation of my invention, hereinafter to be described.

D represents a vertical blade or scraper, and E is a horizontal blade or scraper. The scrapers D and E are to rest against the inner circumference and upon the bottom of the cream-chamber, and to act with a yielding force against said surfaces, so as to scrape off the cream as fast as it freezes and collects on said surfaces.

To render the blades or scrapers capable of binding with a yielding force and of performing the functions just stated, I have found it well in practice to have two rods, *e e*, project at right angles from the inner side of the vertical scraper and from the top side of the horizontal scraper, each of said rods having a spring, *f*, attached to or formed on it, and passing into tubular guide-sockets *g*, projecting radially from the dasher-staff, as shown, so that the springs bear against the dasher-staff and cause the scraper to act against the inner circumference of the cream-chamber in a manner to effectually scrape therefrom the cream which is constantly collecting and freezing, and from the horizontal scraper to have similar spring rods, *e′ e′ f′ f′*, project up vertically and pass into tubular sockets cast on and with the lower radial socket *g*, as shown so that the spring ends of the rods *e′ e′* shall bear against the top of the sockets and cause the scraper to bind with a yielding force against the bottom of the cream-chamber.

What I claim as my invention, and desire to secure by Letters Patent, is—

A scraper or scrapers which act or bind during the process of freezing cream with a yielding spring force against the inner surface or surfaces of the cream-chamber, substantially as and for the purposes set forth.

H. B. MASSER.

Witnesses:
MICH. HUGHES,
M. M. LIVINGSTON.